США005610223A

United States Patent [19]

Mason

[11] Patent Number: 5,610,223
[45] Date of Patent: Mar. 11, 1997

[54] IMPACT MODIFIED POLYAMIDE-BASED MOLDING COMPOSITION

[75] Inventor: James P. Mason, McKees Rocks, Pa.

[73] Assignee: Bayer Corporation, Pittsburgh, Pa.

[21] Appl. No.: 501,911

[22] Filed: Jul. 13, 1995

[51] Int. Cl.⁶ .......................... C08F 283/12; C08L 83/05
[52] U.S. Cl. .............................. 524/504; 525/66; 525/474
[58] Field of Search ............................ 524/504; 525/66, 525/474

[56] References Cited

U.S. PATENT DOCUMENTS

| | | | |
|---|---|---|---|
| 3,668,274 | 6/1972 | Owens et al. | 260/857 G |
| 4,167,505 | 9/1979 | Dunkelberger | 260/37 N |
| 4,174,358 | 11/1979 | Epstein | 525/183 |
| 4,221,879 | 9/1980 | Humme et al. | 525/66 |
| 4,584,344 | 4/1986 | Baer | 525/66 |
| 4,714,739 | 12/1987 | Arkles | 525/92 |
| 5,153,238 | 10/1992 | Bilgrien et al. | 523/211 |
| 5,322,881 | 6/1994 | Yamamoto et al. | 524/504 |

FOREIGN PATENT DOCUMENTS 2083014  5/1993  Canada.

OTHER PUBLICATIONS

R. Buch et al, "Silicone–Based Additives for Thermoplastic Resins Providing improved Impact Strength, Processing and Fire Retardant Synergy", (Dow Corning Corp.) – Fire Retardant Chem. Assoc., Oct. 26–29, 1993.

Primary Examiner—Marion E. McCamish
Assistant Examiner—Helen F. Lee
Attorney, Agent, or Firm—Joseph C. Gil; Aron Preis

[57] ABSTRACT

The impact strength of a thermoplastic molding composition containing polyamide resin is improved upon the incorporation therewith of a particular silicone rubber powder. The silicone rubber powder, added at a level of about 1 to 25 percent contains a mixture of (a) a polydiorganosiloxane and (b) finely divided silica filler.

11 Claims, No Drawings

IMPACT MODIFIED POLYAMIDE-BASED MOLDING COMPOSITION

BACKGROUND OF THE INVENTION

The invention concerns thermoplastic molding composition and more particularly a composition containing a polyamide resin.

The invention is based on the surprising and unexpected finding that the impact performance of a thermoplastic composition containing a polyamide resin is improved upon incorporation therewith of a particular silicone rubber powder. The silicone rubber powder, added at a level of about 1 to 25 percent, relative to the weight of the composition, is characterized in that it contains a mixture of (a) a polydiorganosiloxane and (b) silica.

The art has long recognized and been concerned with improving the impact strength of polyamides. A variety of additives have been suggested and added to polyamides with some improvements being obtained. Many of the additives are elastomeric, for instance, U.S. Pat. No. 3,668,274 disclosed improved impact strength by adding a core/shell polymer containing (a) a core made of a cross linked elastomeric phase and (b) a shell made of a rigid thermoplastic phase which contains amine-reactive moieties. An impact resistant polyamide composition containing a graft product of polybutadiene as a graft substrate and a mixture of acrylate and acrylonitrile and or acrylamide monomers grafted thereon was disclosed in U.S. Pat. No. 4,221,879. Also relevant in this context is U.S. Pat. Nos. 4,167,505; 4,174,358 and 4,584,344.

Of particular relevance in the present context is a paper by R. Buch et al "Silicone-Based Additives for Thermoplastic Resins Providing Improved Impact Strength, Processing and Fire Retardant Synergy". This prior art paper (Dow Corning Corporation) disclosed certain silicone powder resin modifiers products termed RM 4-7081 and RM 4-7051 to be useful in reducing the rate of heat release and the evolution rates of smoke and carbon monoxide of burning plastics. Also disclosed is the impact strength improvement for engineering resins such as polyphenylene ether (PPE) and PPS. Improved impact strength of polyamides has not been reported.

Also related is Canadian Patent Application 2,083,014 which disclosed the silicone rubber powder of the present invention as a component in a composition containing poly(phenylene ether) resin.

It has now been discovered that certain silicone rubber powders, preferably produced in accordance with the procedure disclosed in U.S. Pat. No. 5,153,238 which is incorporated herein by reference, are useful as impact modifier in polyamide compositions. The inventive compositions contain about 1 to 25 percent, preferably 3 to 15 percent relative to the weight of the composition, of the silicone rubber powder. The improvement to the impact strength in the context of this invention refers to improvement in the notched Izod impact strength. Dart impact and unnotched Izod impact strength were not noted to be favorably changed as a result of the incorporation of the silicon rubber powder.

The polyamide matrix resin which is suitable for the preparation of the toughened composition of the present invention is well known in the art and is readily available in commerce. Embraced within the scope of the term are semi-crystalline and amorphous polymeric resins having a number average molecular weight (determined by end-group analysis) of about 5,000 to 30,000 commonly referred to as nylons. Preferably, the molecular weight is in the range of about 8,000 to 20,000. Suitable polyamides include those described in U.S. Pat. Nos. 2,071,250; 2,071,251; 2,130,523; 2,130,948; 2,241,322; 2,312,966; 2,513,606; and 3,393,210, the disclosures of which are incorporated herein by reference. Essentially, the polyamide resin can be produced by condensation of equimolar amounts of a saturated dicarboxylic acid containing 4 to 12 carbon atoms with a diamine, in which the diamine contains 4 to 14 carbon atoms. Excess diamine can be employed to provide an excess of amine end groups over carboxyl end groups in the resulting polyamide. Examples of polyamides include polyhexamethylene adipamide (nylon 66), polyhexamethylene azelamide (nylon 69), polyhexamethylene sebacamide (nylon 610), polyhexamethylene dodecanoamide (nylon 612) and bis(paraaminocyclohexyl)methane dodecanoamide. The polyamide resin can also be produced by ring opening of lactams, for example polycaprolactam and polylauric lactam, and by condensation of ω-amino carboxylic acids, for example, poly-11-aminoundecanoic acid. Copolyamides prepared by copolymerization of two or more of the above polymers or their components, may also be used. The preferred polyamides are nylon 6, nylon 66, and copolymers of nylon 6 and nylon 66. Preferably the polyamides are linear and have a melting temperature in excess of 200° C.

The silicone rubber powder of the invention has an average particle size of about 1 to 1000 microns and contains (i) 100 parts by weight (pbw) of a polydiorganosiloxane and (ii) about 10 to 80 pbw, preferably about 20 to 50 pbw of a finely divided silica filler.

The polydiorganosiloxane which is characterized in that its viscosity at 25° C. is about $10^6$ to $10^9$ centipoise is a (co)polymeric resin having siloxane structural units represented by the general formula

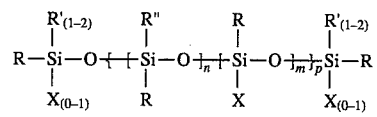

wherein R, R' and R'' independently denote hydrogen, $C_{1-10}$-alkyl, alkenyl, cycloalkyl radicals or aryl groups, and where p is about 1000 to 8000, preferably about 3000 to 6000 and where the relative weight proportions of n and m are 98.5 to 100:0 to 1.5, preferably 99:1, and where X denotes a member selected from the group consisting of

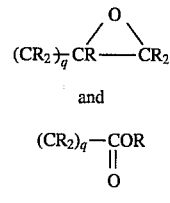

and $$(CR_2)_q\text{---}\underset{\underset{O}{\|}}{C}OR$$

where R denotes hydrogen, $C_{1-10}$-alkyl, alkenyl, cycloalkyl radicals or aryl groups and where q is 1 to 10.

The organic groups of the polydiorganosiloxane, which may optionally be halogenated, are preferably lower alkyl radicals containing 1 to 4 carbon atoms, phenyl and halogen substituted alkyl radicals. Examples include resins containing dimethylsiloxy units, phenylmethylsiloxy units and dimethylsiloxy units and diphenyl siloxy units. Most preferably, the polydiorganosiloxane contains vinyl group(s) or epoxy group(s) at its chain termination(s) and/or along its main chain. The methods for the preparation of suitable polydiorganosiloxane are well known; a typical method comprises the acid- or base-catalyzed polymerization of cyclic diorganosiloxanes.

The silica filler required in the silicone rubber powder is a finely divided silica selected from among fumed silica and precipitated silica or silica gel. These are well known forms of silica and are readily available in commerce. The suitable silica is characterized in that its surface area is at least 50 m$^2$/g, preferably 50 to 900 m$^2$/g.

An additional embodiment entails use of treated silica which contains sites bonded to groups X as defined above; the manufacture of treated silica, typically by reacting the silanol groups on the silica surface with about 1 to 2% by weight of an organic alkyl halide compound or an organosilicon halide compound, is known in the art.

Among the suitable compounds, mention may be made of low molecular weight liquid hydroxy- or alkoxy-terminated polydiorganosiloxanes, hexaorganosiloxanes and hexaorganosilazanes.

The procedure for the preparation of the silicone rubber powder has been described in detail in U.S. Pat. No. 5,153,238, the specification of which is incorporated herein by reference. Suitable silicone rubber powder is available in commerce from Dow Corning Corporation under the trademark RM 4-7051 and RM 4-7081.

The preparation of the composition of the invention is carried out following conventional procedures and by use of conventional means such as single, preferably twin screw extruders. Conventional thermoplastic processes are suitable in molding useful articles from the inventive composition.

Conventional additives may be incorporated in the composition of the invention in the usual quantities. Mention may be made of a thermal stabilizer, a mold release agent, a pigment, a flame retarding agent, a uv stabilizer, a hydrolysis stabilizer, a gamma radiation stabilizer and a plasticizer for polycarbonate compositions, as well as fillers and reinforcing agents such as glass fibers.

The invention is further illustrated but is not intended to be limited by the following examples in which all parts and percentages are by weight unless otherwise specified.

EXAMPLES

Experimental

Compositions in accordance with the invention have been prepared following well-known procedures and their properties determined as described below: the polyamide resin was nylon 6, available from Bayer Corporation as Durethan B40K resin; the silicone rubber powder was Dow Corning's RM 4-7051. Compositions 2 and 3 show the advantageous impact strength (notched Izod, ⅛"). All the compositions were produced by extruding in a twin screw extruder and injection molded (3 oz. Newbury). Since the impact strength of polyamide is highly dependent on its moisture content, the impact strength was determined on specimens as molded and on conditioned samples. The impact strength of the as molded specimens was determined 24 hours after molding; during the 24 hours period, the specimens were held at 50% relative humidity at 73° F. The notched Izod impact strength of the conditioned specimens was determined 14 days after molding. During the 14 days period the specimens were first immersed in deionized water for seven days at 73° F. and then removed from the water and sealed in an air tight bag for seven days at 73° F. The impact strength and moisture absorption of the samples were determined using ASTM D256 and D570 respectively. A summary of the results is presented below. Instrumented impact measured as total energy, dart impact, speed of the dart 15 miles per hour, was determined in accordance with ASTM D 3763. The unnotched values of the composition showed no advantage for using the silicon rubber powder.

TABLE 1

| Example | 1 | 2 | 3 |
|---|---|---|---|
| Polyamide, wt. % | 100 | 97 | 90 |
| Silicone rubber powder wt. % | 0 | 3 | 10 |
| Water Absorption, as molded | 1 | 1 | 1 |
| Water absorption, conditioned | 9 | 9 | 9 |
| Dart Impact, ft. lb at 73 F. | 8.4 | 2.7 | 2.7 |
| Impact strength, ft. lb./in. notched Izod ⅛" | | | |
| as molded | 1 | 1.4 | 2.5 |
| conditioned | 1.9 | 3.2 | 13.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (a) about 75 to 99 percent of a polyamide resin, and (b) about 1 to 25 percent of a silicone rubber powder, said percent relative to the weight of the composition, said silicone rubber powder having an average particle size of about 1 to 1000 microns and containing (i) 100 pbw of a polydiorganosiloxane having a viscosity at 25° C. is about 10$^6$ to 10$^9$ centipoise and siloxane structural units represented by the general formula

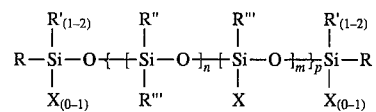

wherein R', R" and R''' independently denote a hydrogen atom, C$_{1-10}$-alkyl, cycloalkyl radicals or aryl groups, and where p is about 1000 to 8000 and where the relative weight proportions of n and m is 98.5 to 100:0 to 1.5, and where X denotes a member selected from the group consisting of

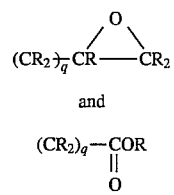

where R denotes hydrogen, C$_{1-10}$-alkyl, cycloalkyl radicals or aryl groups and where q is 1–10, and (ii) about 10 to 80 pbw of a finely divided silica selected from among fumed silica, precipitated silica and silica gel having a surface area of at least 50 m$^2$/g, said composition characterized in that it has a notched Izod impact strength value which is greater than that of the polyamide resin alone.

2. The composition of claim 1 wherein said hydrocarbon radical is selected from the group consisting of C$_{1-10}$ alkyl radicals; alkenyl radicals; cycloalkyl radicals; and aromatic hydrocarbon radicals.

3. The composition of claim 2 wherein said hydrocarbon radical is a lower alkyl radical containing 1 to 4 carbon atoms or a phenyl radical.

4. The composition of claim 1 wherein said silica has a surface area of about 50 to 900 m²/g.

5. The composition of claim 1 wherein said p is about 5000 to 6000.

6. The composition of claim 1 wherein the relative weight proportions of n and m is 99:1.

7. The composition of claim 1 wherein said silica contains sites bonded to said X.

8. The composition of claim 1 further containing at least one member selected from the group consisting of a thermal stabilizer, a mold release agent, a pigment, a flame retarding agent, a uv stabilizer, a hydrolysis stabilizer, a gamma radiation stabilizer, a plasticizer, a filler and a reinforcing agent.

9. A thermoplastic molding composition comprising (a) about 85 to 97 percent of a polyamide resin, and (b) about 3 to 15 percent of a silicone rubber powder, said percent being relative to the weight of the composition, said silicone rubber powder having an average particle size of about 1 to 1000 microns and containing (i) 100 pbw of a polydiorganosiloxane having a viscosity at 25° C. is about $10^6$ to $10^9$ centipoise and siloxane structural units represented by the general formula

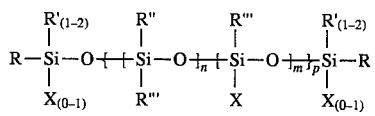

wherein R', R" and R''' independently denote a hydrogen atom, $C_{1-10}$-alkyl, cycloalkyl radicals or aryl groups, and where p is about 1000 to 8000 and where the relative weight proportions of n and m is 98.5 to 100:0 to 1.5, and where X denotes a member selected from the group consisting of

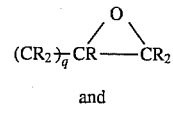

and $(CR_2)_q$—COR
               ‖
               O where R denotes hydrogen, $C_{1-10}$-alkyl, cycloalkyl radicals or aryl groups and where q is 1 to 10, and (ii) about 20 to 50 pbw of a finely divided silica selected from among fumed silica, precipitated silica and silica gel having a surface area of at least 50 m²/g, said composition characterized in that it has a ⅛" notched Izod impact strength value which is greater than that of the polyamide resin alone.

10. The composition of claim 9 wherein said silica has a surface area of about 50 to 900 m²/g.

11. The composition of claim 9 wherein the relative weight proportions of n and m is 99:1.

* * * * *